US012723746B1

(12) United States Patent
Wynja et al.

(10) Patent No.: US 12,723,746 B1
(45) Date of Patent: Sep. 1, 2026

(54) UNIVERSAL MOUNT FOR BI-PIN LAMP HOLDER

(71) Applicant: The World Effect LLC, Denver, CO (US)

(72) Inventors: Beau Wynja, Denver, CO (US); Meggan Wynja, Denver, CO (US); Sean Lerch, Denver, CO (US)

(*) Notice: Subject to any disclaimer, the term of this patent is extended or adjusted under 35 U.S.C. 154(b) by 0 days.

(21) Appl. No.: 19/430,744

(22) Filed: Dec. 23, 2025

(51) Int. Cl.
*F21V 23/00* (2015.01)
*F21V 17/06* (2006.01)

(52) U.S. Cl.
CPC ............ *F21V 23/002* (2013.01); *F21V 17/06* (2013.01)

(58) Field of Classification Search
CPC ........ F21V 21/29; F21V 23/06; F21V 17/002; F21V 17/06; F21V 19/00; F21V 19/0085; F21V 23/00
See application file for complete search history.

(56) References Cited

U.S. PATENT DOCUMENTS

| | | | | |
|---|---|---|---|---|
| 4,426,677 | A * | 1/1984 | Dennis | F21V 17/12 362/453 |
| 7,794,282 | B1 * | 9/2010 | Barger | H01R 13/6633 439/646 |
| 10,113,730 | B2 * | 10/2018 | Wang | F21S 9/02 |
| 10,184,642 | B2 | 1/2019 | Geels et al. | |
| 11,073,260 | B2 | 7/2021 | Cadisch et al. | |
| 11,608,966 | B1 * | 3/2023 | Groat | F21S 8/081 |
| 2015/0055354 | A1 * | 2/2015 | Mueller | F21V 29/773 362/373 |
| 2017/0067622 | A1 | 3/2017 | Chao et al. | |
| 2023/0228403 | A1 | 7/2023 | Lin et al. | |

FOREIGN PATENT DOCUMENTS

| | | | |
|---|---|---|---|
| EP | 1486724 | A1 | 12/2004 |
| EP | 2431659 | A1 | 3/2012 |

* cited by examiner

*Primary Examiner* — William J Carter
(74) *Attorney, Agent, or Firm* — McConnell Law Firm P.C.; Robert McConnell

(57) ABSTRACT

A universal mount for bi-pin lamp holder which includes a bi-pin lamp connector for bi-pin lamps, a novel strain relief mechanism, external threads to secure a lamp shade or diffuser, and an internal threaded hole which may be used to securely attach the mount to a fixture or lamp. The strain relief mechanism fits within the body of the mount with one curved side and one side that has teeth for frictional force. A power cord is routed through the body and attached to a ground terminal and a lamp mount with a bi-pin lamp connector. A set screw is used to adjust the strain relief mechanism to cause the teeth to connect with the power cord to secure the power cord. A second set screw secures the ground wire to the ground terminal.

10 Claims, 24 Drawing Sheets

UNIVERSAL MOUNT FOR BI-PIN LAMP HOLDER

BACKGROUND OF THE INVENTION

Field of the Invention

The present invention relates to sockets, holders and mounts for lamps and light bulbs. These sockets, holders and mounts secure lamps/light bulbs and provide electrical connections. Typically, these devices are secured to a light fixture or lamp with decorative features such as a cover, globe or glass cover. The devices also provide electrical connection to the light source, including power and ground connections. Such fixtures or lamps may be fixed to a wall or ceiling, with wiring directly connected to the building power supply or utilized in a portable, free standing lamp with a plug that couples with a typical power socket. For purposes of this application, such devices will be discussed as holders, but other terms well known in the art may be used such as sockets and mounts.

The simplest form of a lamp holder is a typical screw type incandescent light bulb socket. Incandescent light bulbs produce light by heating a filament until it glows. Electricity is routed through the filament, which provides resistance, and thus creates heat and the required glow. The filament is enclosed in a glass dome with a metal threaded base. The threaded metal base includes power and ground connections and couples with a complementary threaded socket. The socket includes connections to a power supply and generally a mounting connection to a fixture or lamp. Incandescent light bulbs are generally inefficient, use a significant amount of electricity for a given light output and the filaments burn out quickly. Several new lighting types have emerged that are more efficient, provide much more light for a given amount of electricity and are much more long lasting. These lighting types include fluorescent, halogen and light emitting diode (LED).

These new lamp types, particularly halogen and LED, utilize new and more compact forms of electrical connection. The present invention relates to lights using a bi-pin or two pin plug connector. Bi-pin connectors include two metallic pins that plug into complementary sized and shaped holes on the lamp holder. The pins of bi-pin connectors have a variety of shapes, pin thickness, and distance between the two pins. The distance between the two pins comes in many standard types such as G4 (4 mm pin spacing), G5 (5 mm pin spacing), GU5.3/GX5.3/GY5.3 (5.3 mm pin spacing), G6.35/GY6.35/GZ6.35 (6.35 mm pin spacing), GY8 (8 mm pin spacing), G8.5 (8.5 mm pin spacing), G9 (9 mm pin spacing), G9.5/GY9.5/GZ9.5 (9.5 mm pin spacing), and G12 (12 mm pin spacing). Other pin-bi lamps may have different pin configurations and spacing. The present invention relates to an improved universal mount for bi-pin lamp holders.

SUMMARY OF THE INVENTION

A universal mount for bi-pin lamp holder which includes a bi-pin lamp connector for bi-pin lamps, a novel strain relief mechanism, external threads to secure a lamp shade or diffuser, and an internal threaded hole to securely which may be used to securely attach the mount to a fixture or lamp. The strain relief mechanism fits within the body of the mount with one curved side and one side that has teeth for frictional force. A power cord is routed through the body and attached to a ground terminal and a lamp mount with a bi-pin lamp connector. A set screw is used to adjust the strain relief mechanism to cause the teeth to connect with the power cord to secure the power cord. A second set screw secures the ground wire to the ground terminal.

DESCRIPTION OF THE PREFERRED EMBODIMENT

The following detailed description refers to the preferred embodiment of the disclosed invention as shown in the attached figures and in the below description. This detailed description is not meant to limit the scope of the invention in any way but is intended to disclose the preferred embodiment/best mode of the invention at the time of filing this application.

Figure 1:
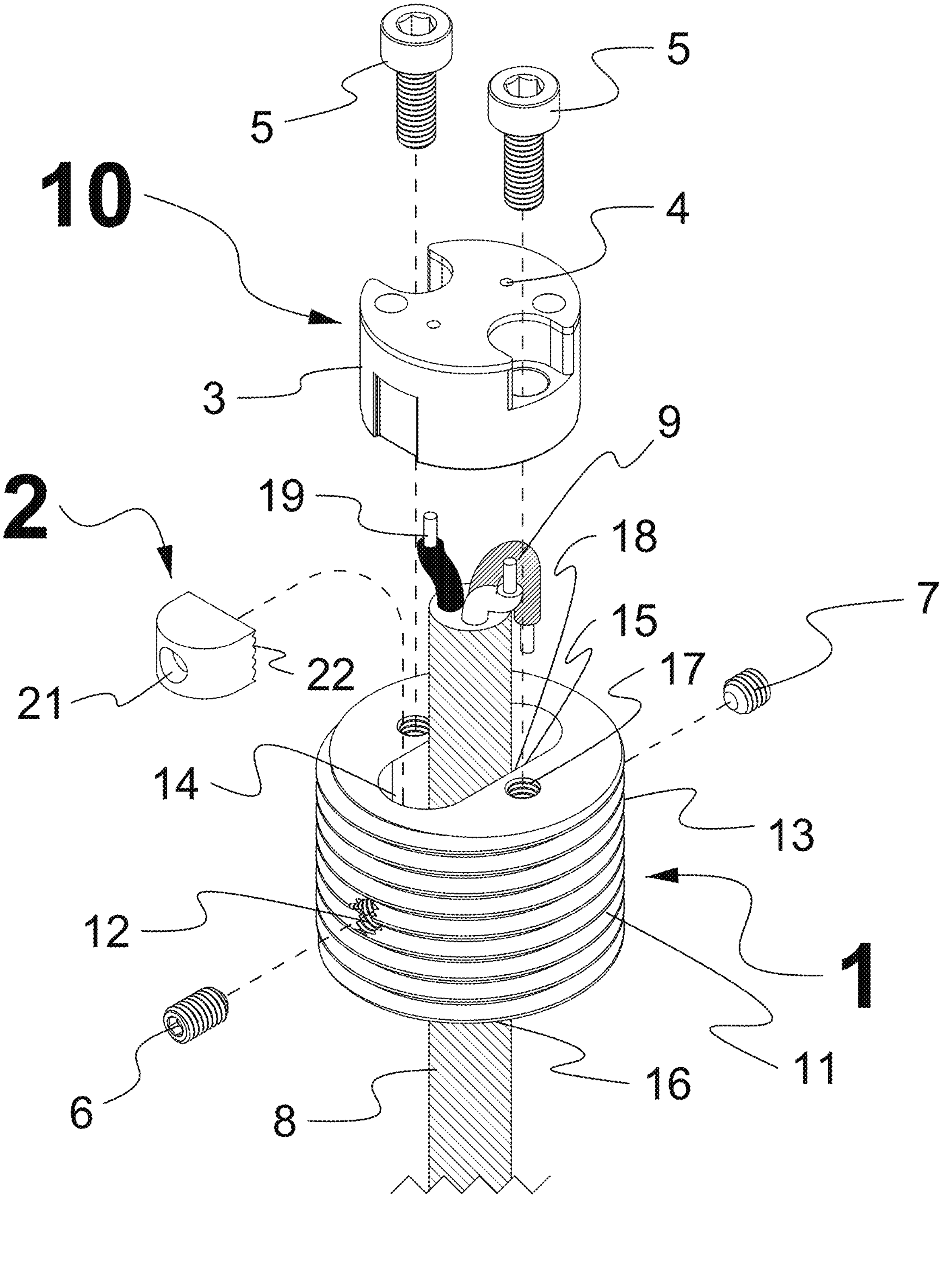
FIG. 1 is an exploded perspective view of the universal mount for bi-pin lamp holder.

FIG. 1 is a perspective view of the universal mount for bi-pin lamp holder 10 of the present invention. This exploded view shows all the component parts removed from their respective locations. Universal mount for bi-pin lamp holder 10 ("mount") includes the following key features: 1) bi-pin lamp connector for bi-pin lamps, 2) a novel strain relief mechanism, 3) external threads to secure a lamp shade or diffuser, and 4) an internal threaded hole which may be used to secure mount 10 to a fixture or lamp. Each of these features will be described in relation to the component parts of mount 10 below.

Mount 10 is comprised of body 1 with external threads 11 and threaded mounting hole 16, bi-pin lamp holder 3 with lamp connector 4, and strain relief mechanism 2. Body 1 forms the base of mount 10 and includes external threads 11 for coupling with a lamp shade or diffuser with complementary internal threads. These threads can be any size and shape, but in the preferred embodiment the external thread is M24×2. Body 10 also includes an internally threaded mounting hole 16 at the bottom of mount 10. Threaded mounting hole 16 may be utilized for attaching mount 10 to a fixture or lamp using a complementary sized externally threaded attachment surface such as lamp pipe well known in the art. Threaded mounting hole 16 is also used to route power cord 8 into and through mount 10. Threaded mounting hole 16, in the preferred embodiment, is internally threaded with ⅛ IPS lamp thread, i.e ⅜" diameter pipe with 27 threads per inch. Other thread configurations well known in the art may also be utilized.

Power cord 8 is comprised of two wires: 1) power wire 19 and 2) ground wire 9. Power carried by power wire 19 may be any current type (direct or alternating) or voltage (12V, 120V, 240V) well known in the art. Ground wire 9 is connected between ground hole 16 and the ground circuit of the wiring providing power. In the preferred embodiment, power cord 8 is 18/3 SVT-B cord which comprises 18 wire gauge wire. Body 1 also includes upper wire opening 14 through which power cord 8 continues into mount 10. Upper wire opening 14 also houses strain relief mechanism 2. Body 1 also includes internally threaded strain relief hole 12 that houses strain relief set screw 6 and internally threaded ground hole 13 that houses ground set screw 7. Attached to body 1 using mount screws 5 is lamp holder 3 that houses lamp connector 4.

Strain relief mechanism 2 is oriented within upper wire opening 14 and includes set screw receiving hole 21 and toothed strain relief surface 22. Upper wire opening 14 is rectangularly shaped with one curved internal surface shaped to couple with smooth strain relief surface 18. Set screw receiving hole 21 receives the threads of strain relief set screw 6 which is utilized to adjust the pressure of strain relief mechanism 2 on power cord 8. Strain relief mechanism 2 prevents strain and movement of power cord 8 which can result in damage or detaching of power wire 19 or ground wire 9 when mount 10 is used in flexible positions or as hanging/luminaire lamps. Toothed strain relief surface 22 couples with power cord 8 providing frictional resistance that prevents strain on power cord 8 and thus power wire 19 and ground wire 9. This frictional resistance prevents detachment of power cord 8 from mount 10.

Body 1, strain relief mechanism 2 and lamp holder 3 are all made of suitable non-conducting materials such as plastic, PETG plastic, aluminum, or porcelain. Aluminum is utilized in the preferred embodiment due to its light weight, durability and ease of manufacture.

Figure 2:
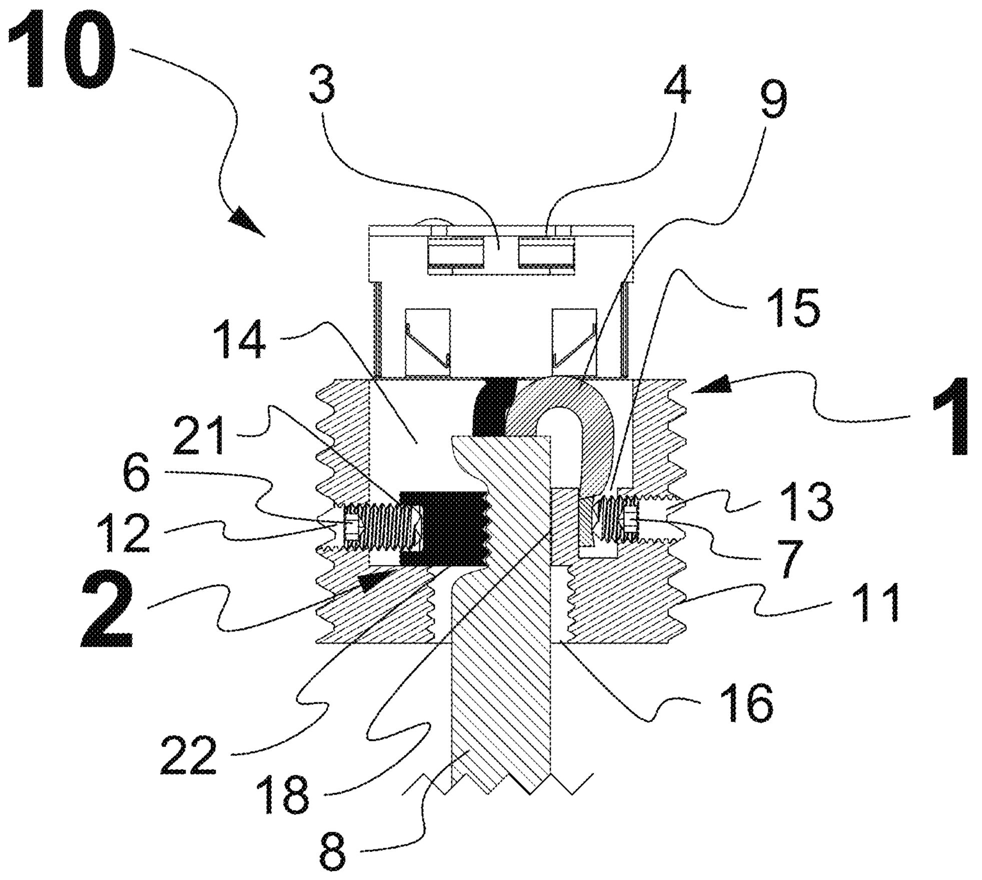
FIG. 2 is a first cross-sectional view of the universal mount for bi-pin lamp holder.

FIG. 2 is a cross-sectional view of mount 10 with power cord 8, lamp holder 3 and strain relief mechanism 2 installed. Power cord 8 is routed through threaded mounting hole 16 with ground wire 9 fixed to mount 10 by ground set screw 7 which is accessed and adjusted through threaded ground hole 13. Power wire 19 is coupled to lamp holder 3 and lamp connector 4 to provide electrical power to a lamp positioned in lamp connector 4. Strain relief mechanism 2 is engaged with power cord 8 to prevent/reduce strain and movement on cord 8. Toothed strain relief surface 22 provides frictional resistance against power cord 8. The position of strain relief mechanism is adjusted by movement of strain relief set screw 6 positioned in strain relief hole 12.

Figure 3:
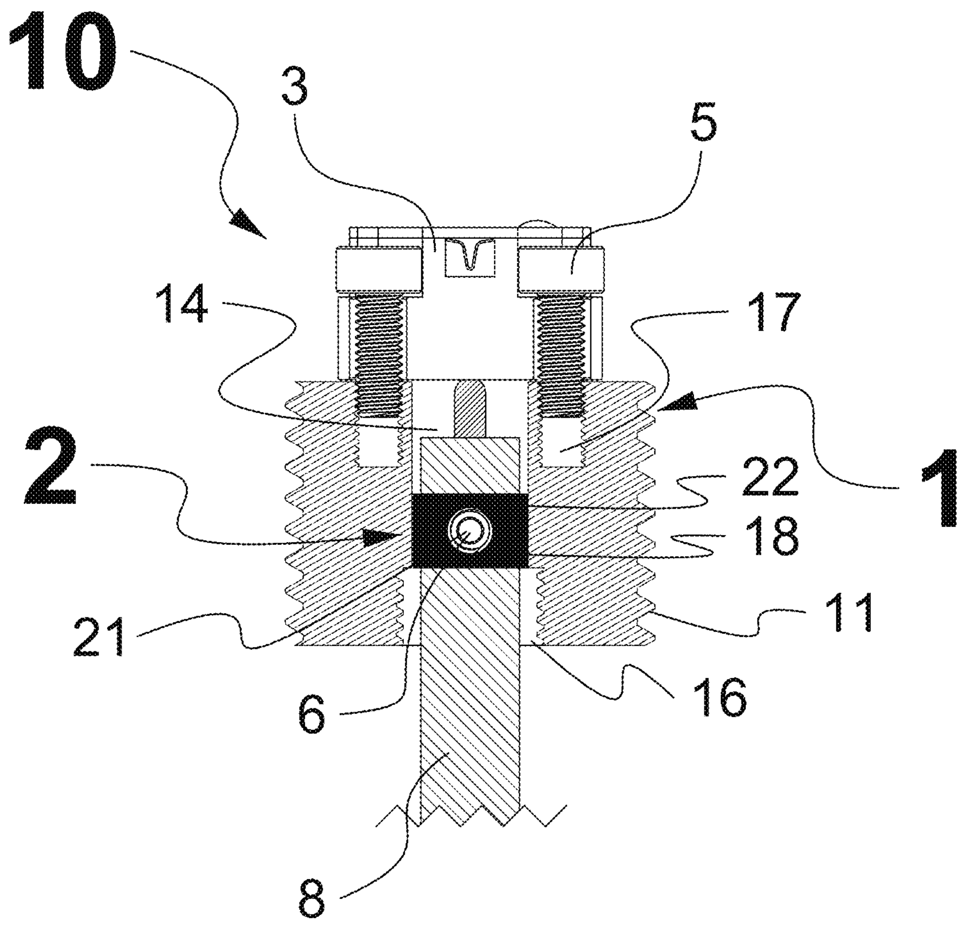
FIG. 3 is a second cross-sectional view of the universal mount for bi-pin lamp holder.

FIG. 3 shows a second cross-sectional view of mount 10 with power cord 8, lamp holder 3 and strain relief mechanism 2 installed. In this view, mount screws 5 to couple lamp holder 3 to body 1. Power cord 8 is routed through threaded mounting hole 16 and strain relief mechanism 2 is positioned within upper wire opening 14. Another view of strain relief set screw 6, and strain relief surface 18 are also shown.

Figure 4:
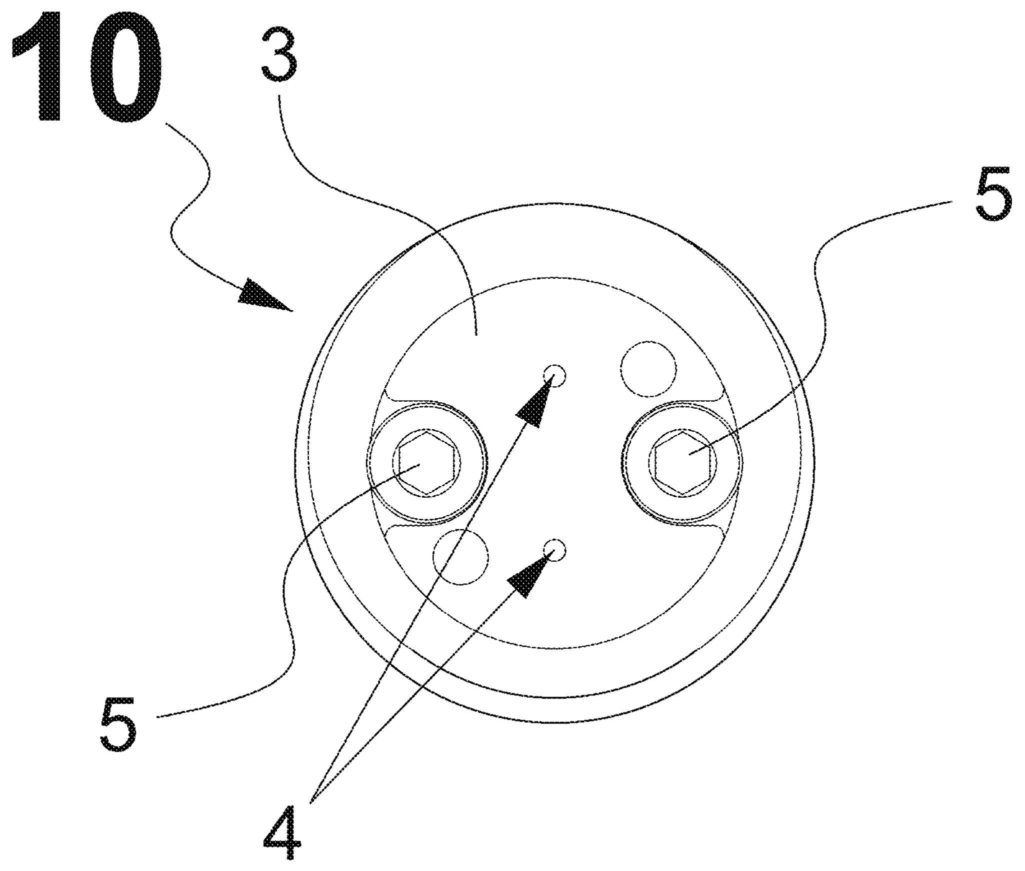
FIG. 4 is a top view of the universal mount for bi-pin lamp holder.

FIG. 4 is a top perspective view of mount 10 with lamp mount 3 coupled to body 1 by mount screws 5.

Figure 5:
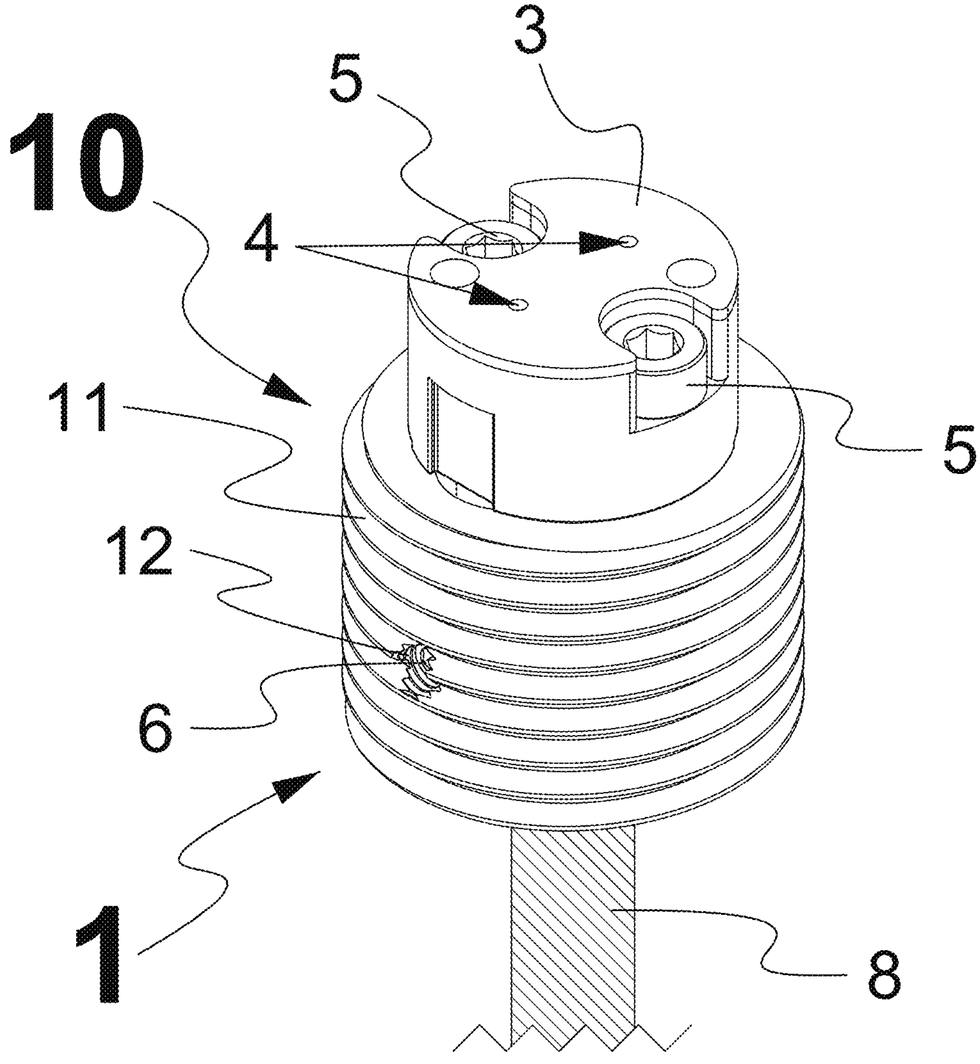
FIG. 5 is a perspective view of the assembled universal mount for bi-pin lamp holder.

FIG. 5 is a top perspective view of mount 10 with lamp mount 3 coupled to body 1 by mount screws 5. In this view, the upper surface of lamp mount 3 is shown with bi-pin lamp connector 4. Mount screws 5 are shown securing lamp mount 3 to body 1. Strain relief set screw 6 is positioned in strain relief hole 12. External threads 11 are also shown in detail. Lastly, power cord 8 is shown extending from threaded mounting hole 16.

Figure 6:
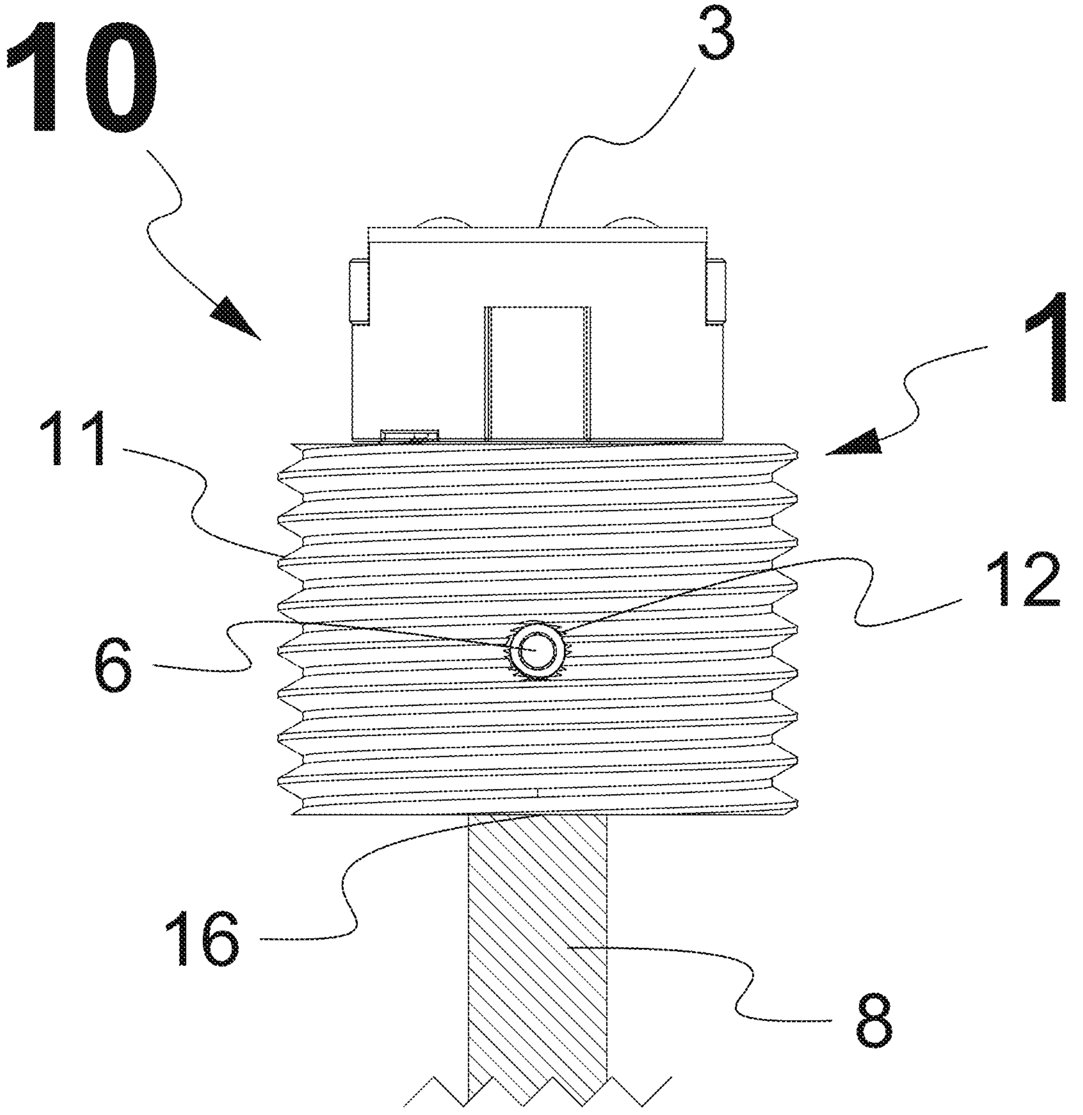
FIG. 6 is a first side view of the universal mount for bi-pin lamp holder.

FIG. 6 is a first side view of mount 10 with strain relief set screw 6 shown positioned in strain relief hole 12. External threads 11 are visible with power cord 8 extending outward from body 1 through threaded mounting hole 16.

Figure 7:
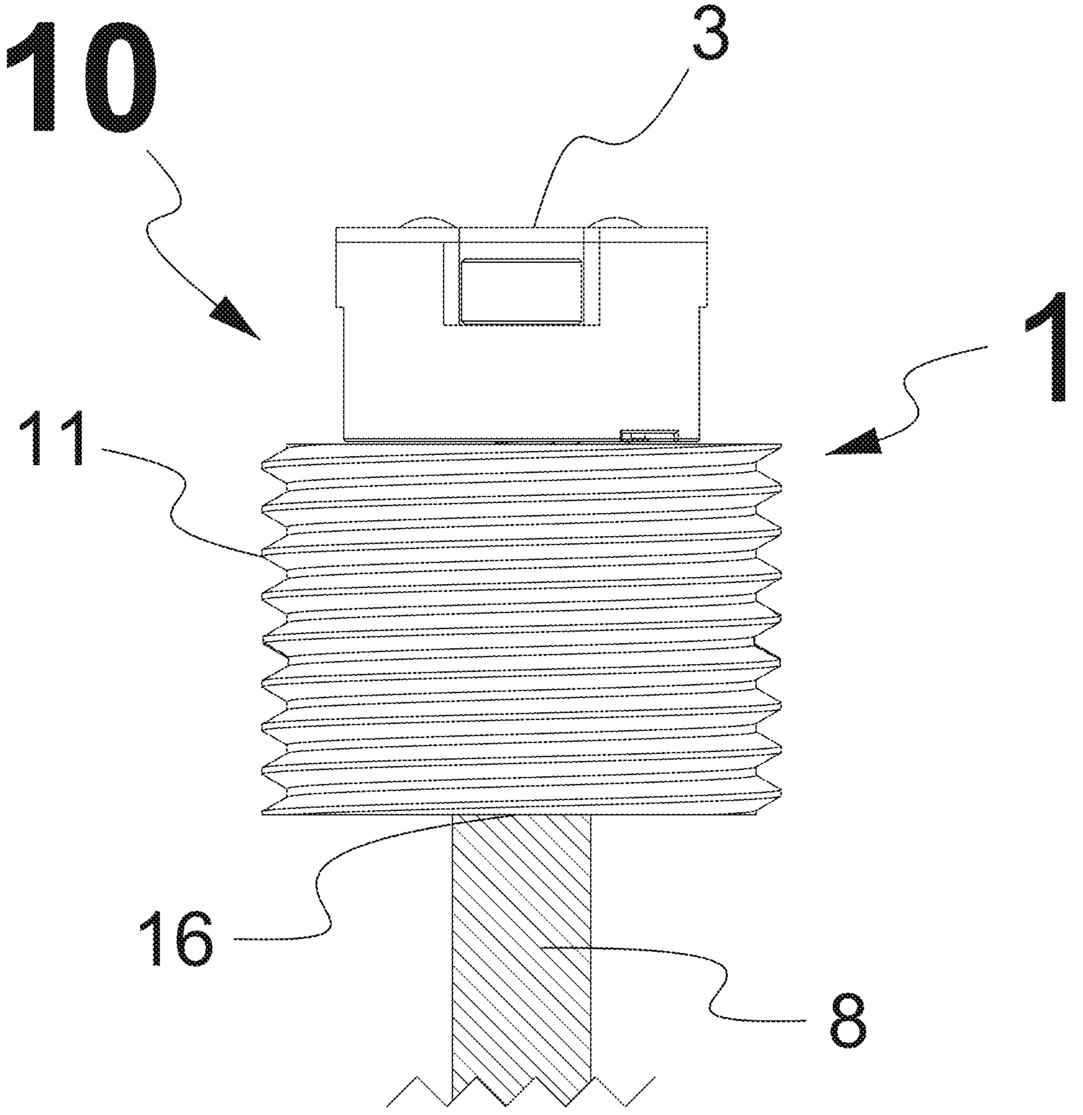
FIG. 7 is a second side view of the universal mount for bi-pin lamp holder.

FIG. 7 is a second side view of mount 10 with neither set screw shown. In this view, external threads 11 are visible as is power cord 8 extending outward from body 1 through threaded mounting hole 16.

Figure 8:
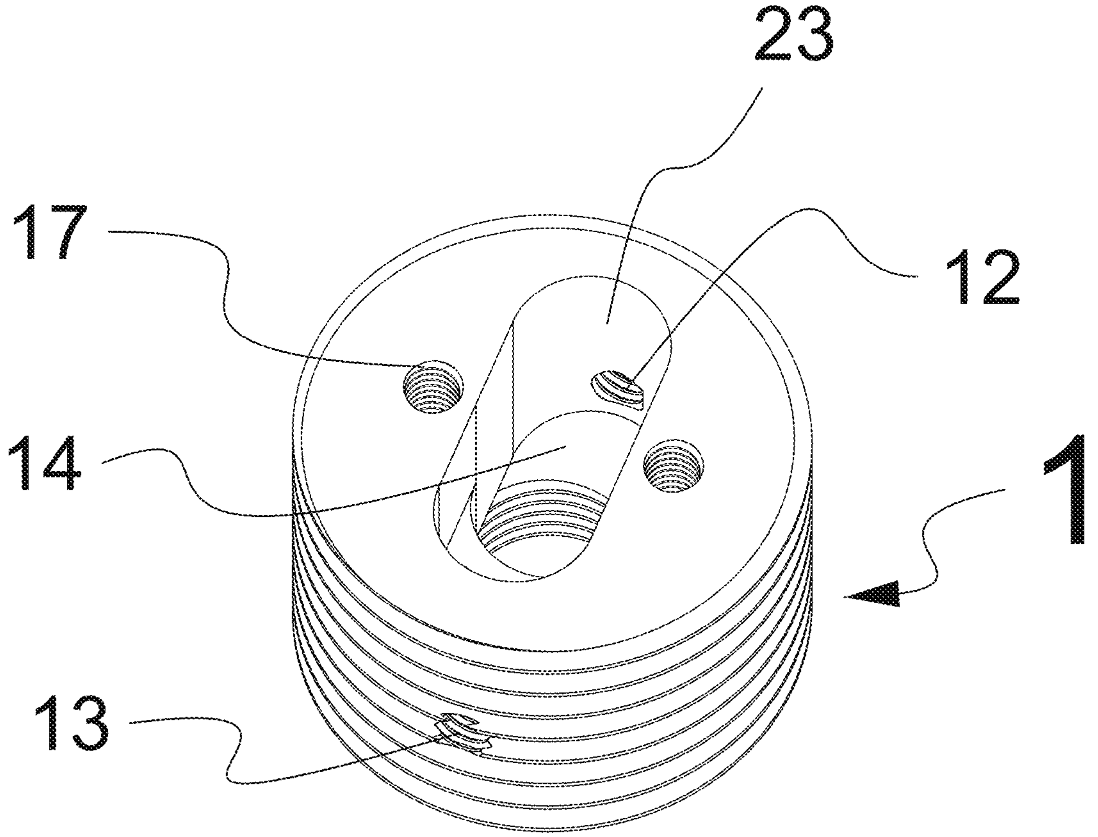
FIG. 8 is a first top perspective view of the body.

FIG. 8 is a first top perspective view of body 1 with upper wire opening 14 shown. In this view, the curved inner wall 23 is shown. Curved inner wall 23 couples with smooth strain relief surface 18 of strain relief mechanism 2. Internally threaded strain relief hole 12 is shown without strain relief set screw 6. Lamp holder mounting holes 17 couple with mount screws 5 to secure lamp holder 3 to body 1.

Figure 9:
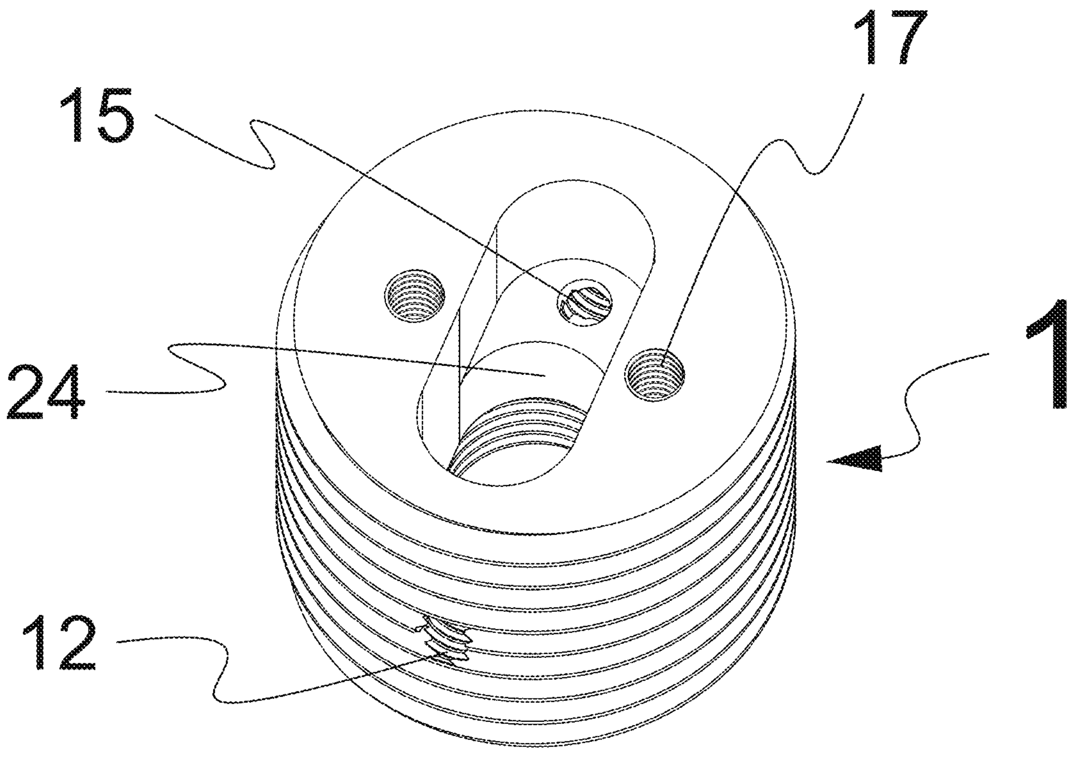
FIG. 9 is a second top perspective view of the body.

FIG. 9 is a second top perspective view of body 1 with a second view of upper wire opening 14 shown. In this view, inner surface 24 of threaded mounting hole 16 is shown. This inner surface 24 interfaces with power cord 8 while strain relief mechanism 2 is engaged. Ground terminal 15 is shown for attachment to ground wire 9.

Figure 10:
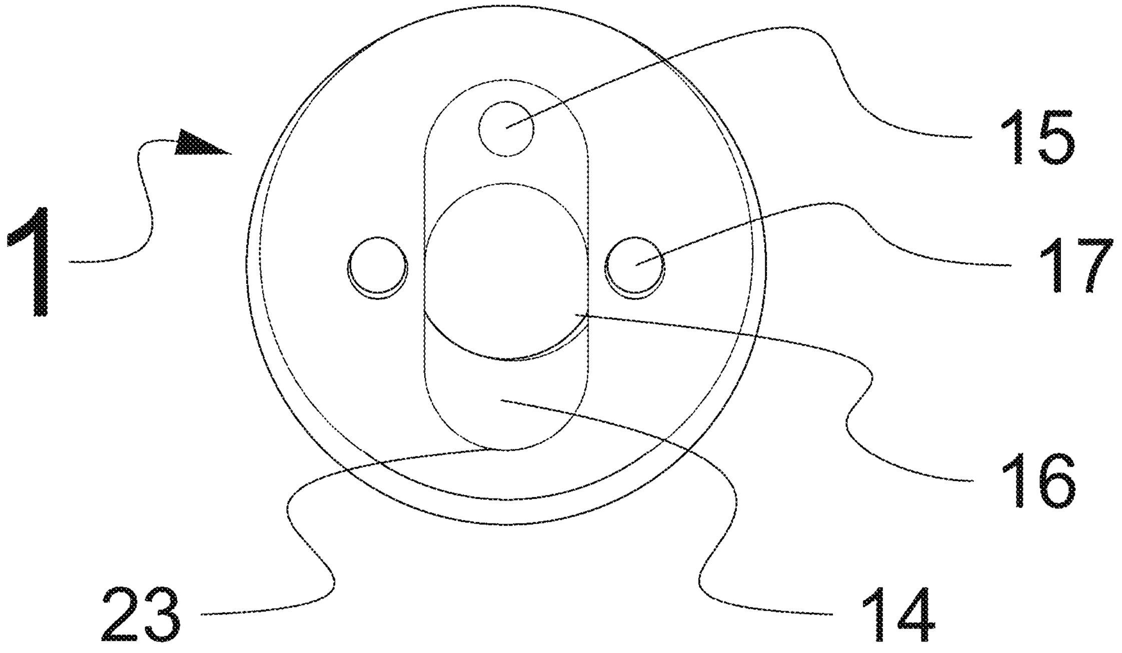
FIG. 10 is a top view of the body.

FIG. 10 is a top view of body 1 with upper wire opening 14 visible. The shape of curved inner wall 23 is shown as is the top of threaded mounting hole 16. Curved inner wall 23 couples with the complementary curved shape of strain relief mechanism 2.

Figure 11:
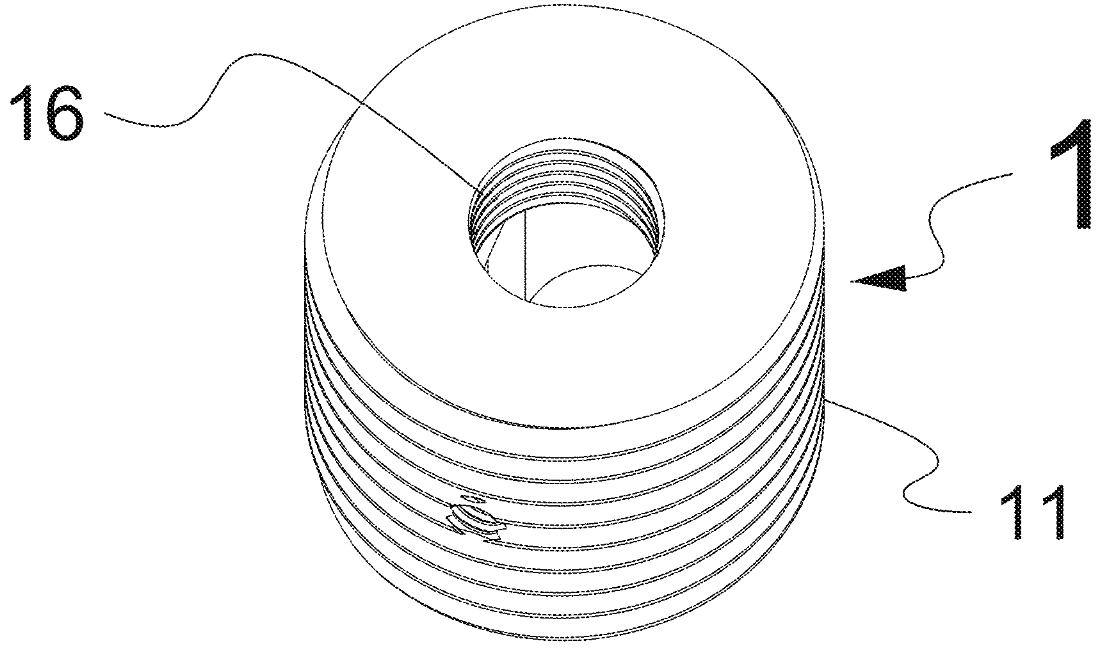
FIG. 11 is a bottom perspective view of the body.

FIG. 11 is a bottom perspective view of body 1. In this view, the shape and threads of threaded mounting hole 16 are shown.

Figure 12:
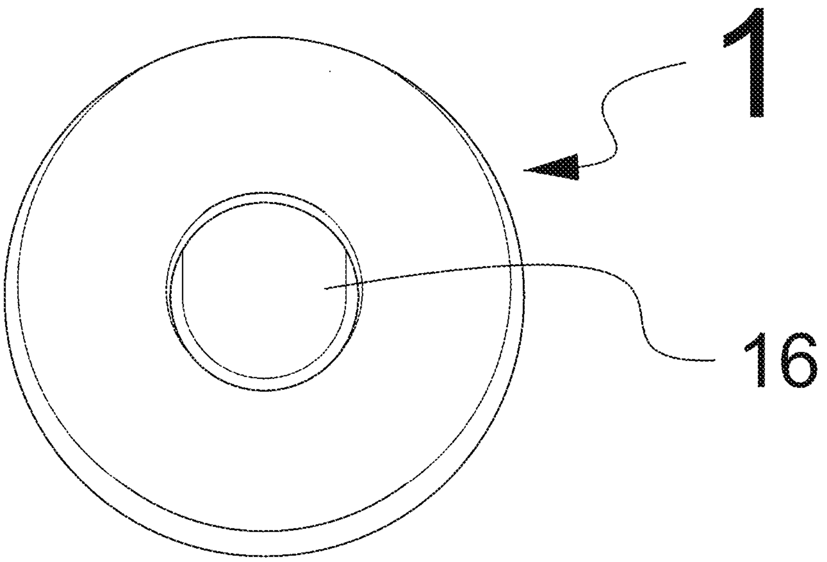
FIG. 12 is a bottom view of the body.

FIG. 12 is a bottom view of body 1 with threaded mounting hole 16 shown.

Figure 13:
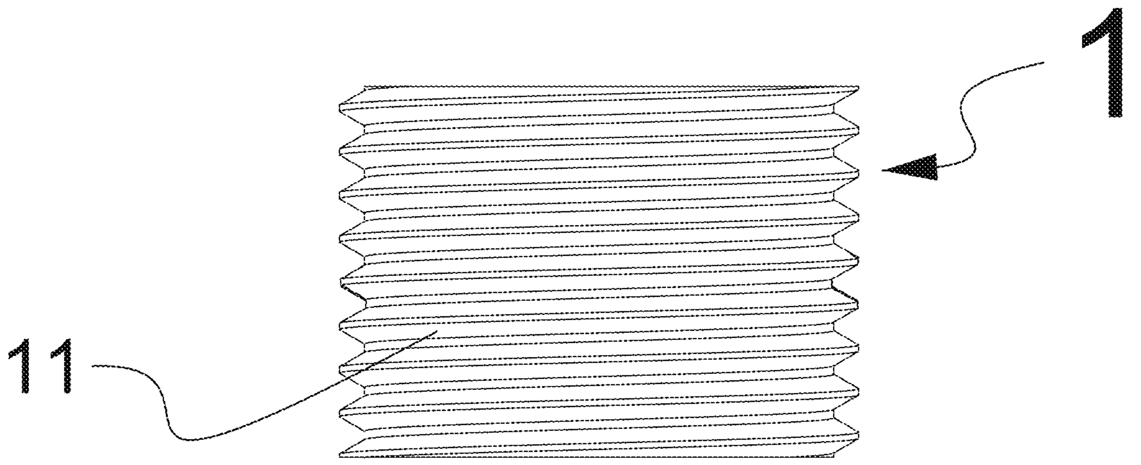
FIG. 13 is a first side view of the body.

FIG. 13 is a side view of body 1 with external threads 11 shown.

Figure 14:
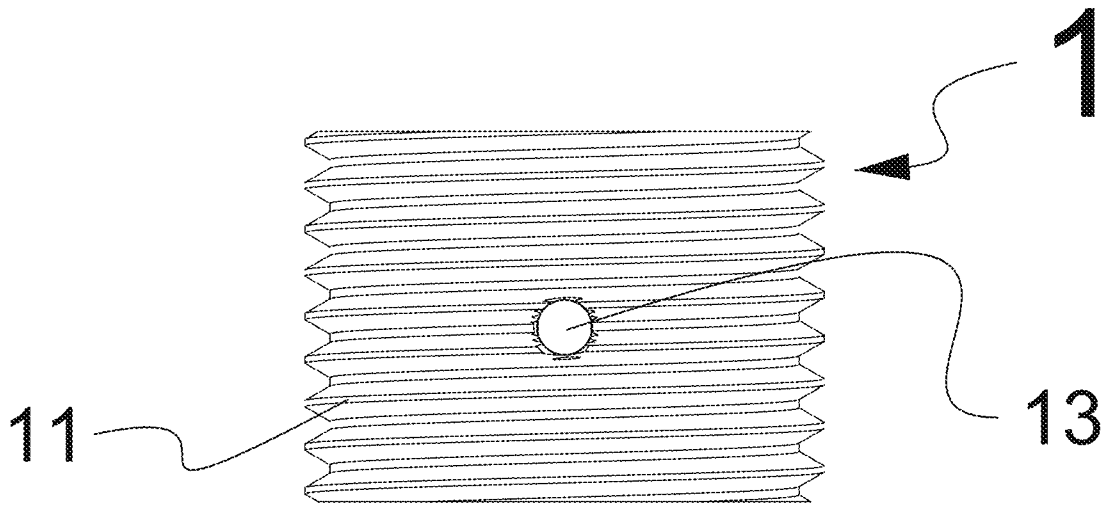
FIG. 14 is a second side view of the body.

FIG. 14 is a side view of body 1 with external threads 11 and internally threaded ground hole 13 shown.

Figure 15:
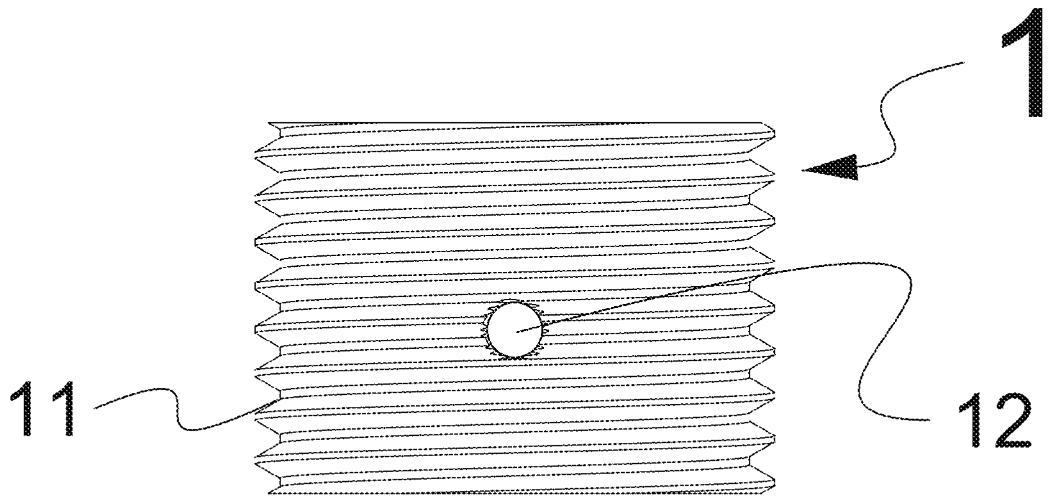
FIG. 15 is a third side view of the body.

FIG. 15 is an alternate side view of body 1 with external threads 11 and internally threaded strain relief hole 12 shown.

Figure 16:
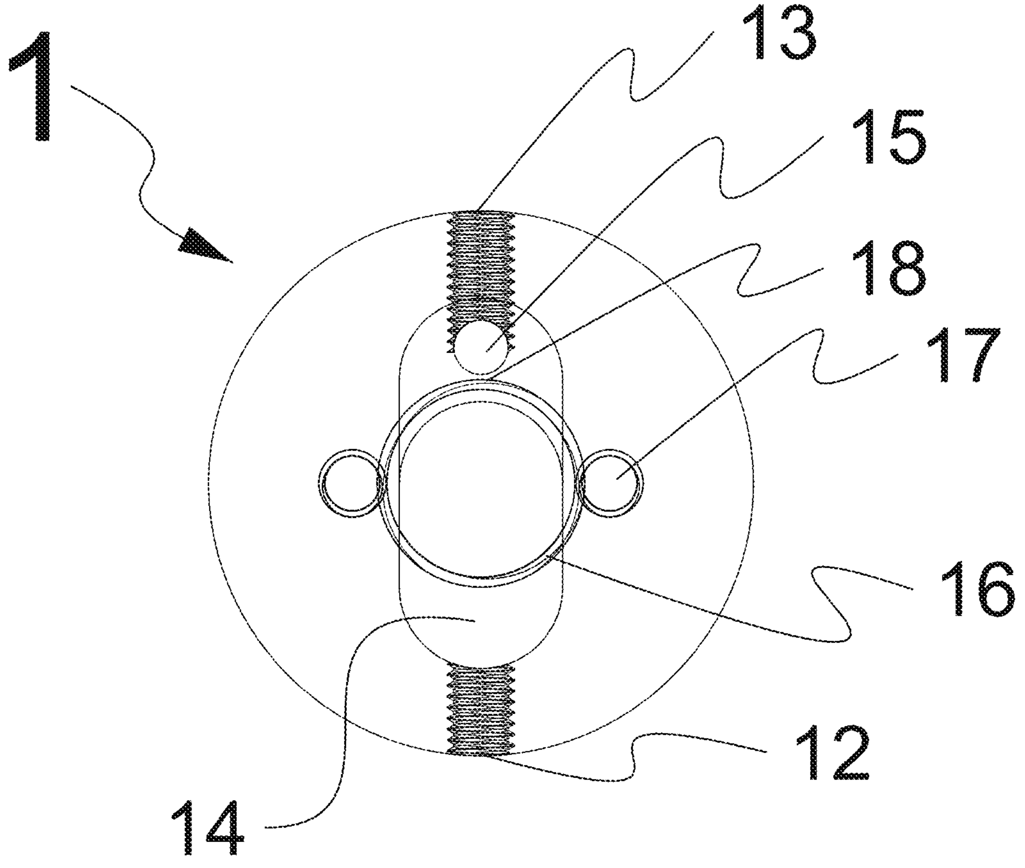
FIG. 16 is a top cross-sectional view of the body.

FIG. 16 is a top cross-sectional view of body 1 with internally threaded ground hole 13 and internally threaded strain relief hole 12 shown. Also shown is upper wire opening 14, ground terminal 15, threaded mounting hole 16, lamp holder mounting holes 17, and smooth strain relief surface 18.

Figure 17:
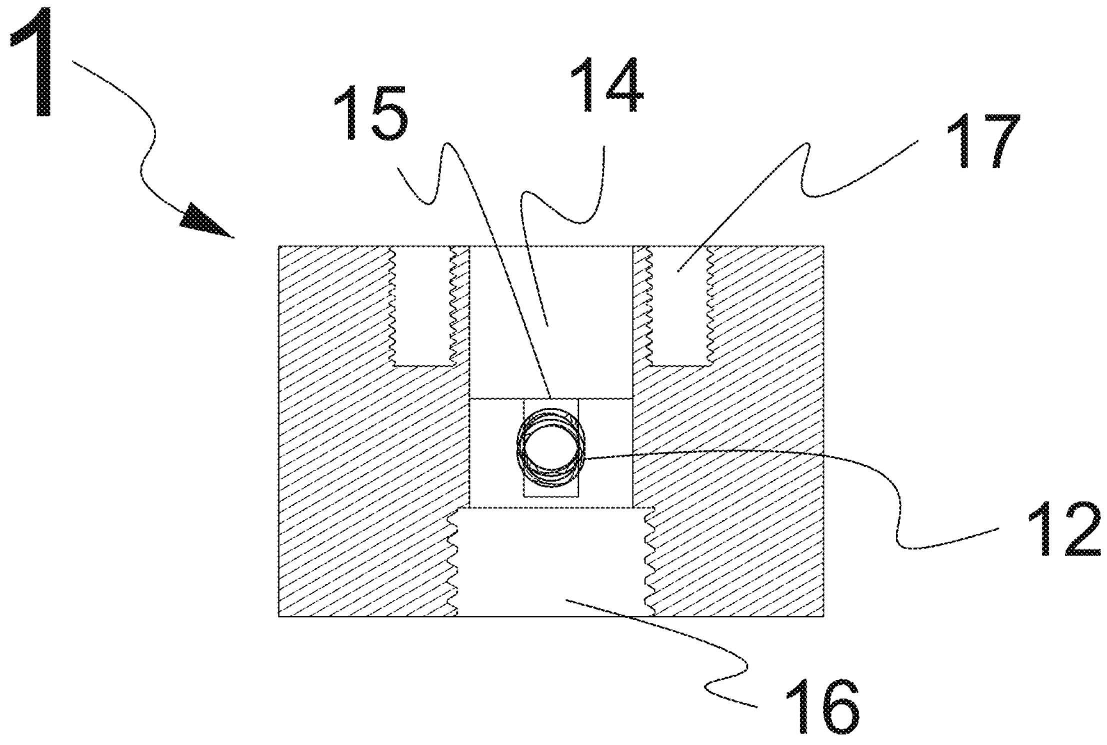
FIG. 17 is a first side cross-sectional view of the body.

FIG. 17 is a side cross-sectional view of body 1 with upper wire opening 14, threaded mounting hole 16, ground terminal 15, internally threaded strain relief hole 12, and lamp mounting holes 17 shown. The internal threads of threaded mounting hole 16 are visible in this view.

Figure 18:
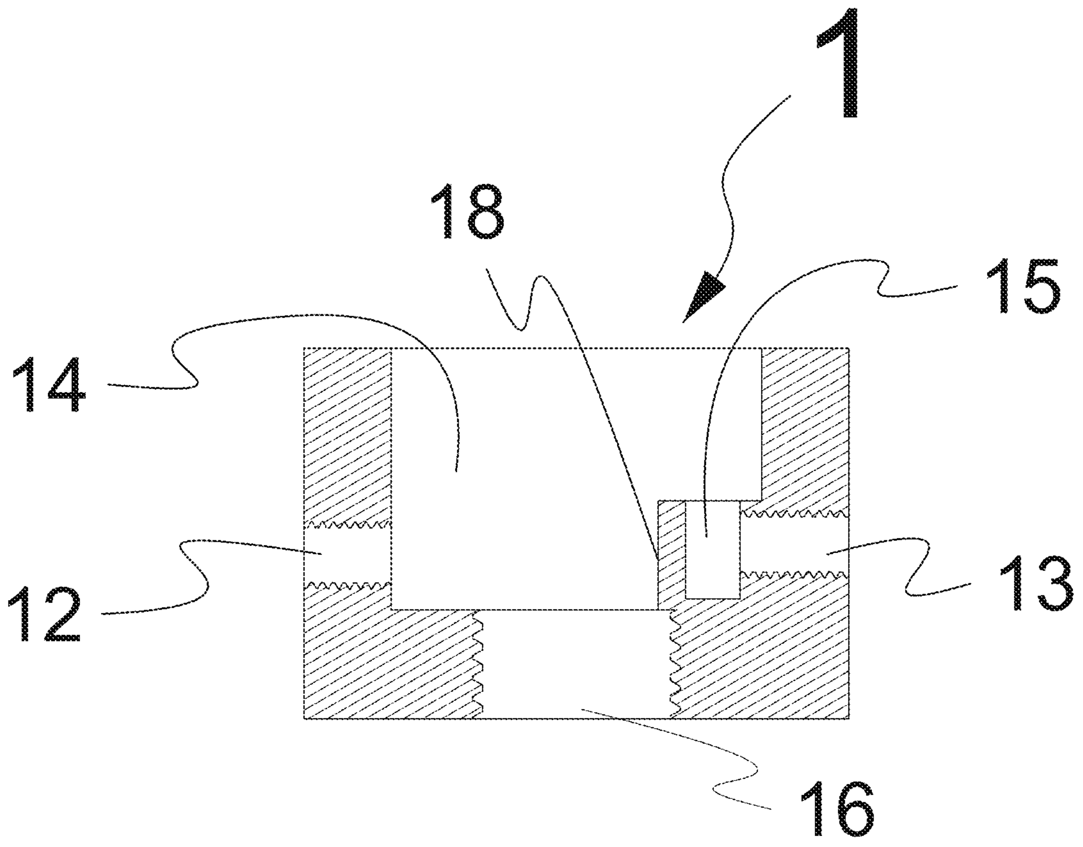
FIG. 18 is a second side cross-sectional view of the body.

FIG. 18 is an alternate side cross-sectional view of body 1. In this view, the shape of upper wire opening 14 is shown with both strain relief hole 12 and ground hole 13 visible. The internal threads of both strain relief hole 12 and ground hole 13 are also shown. A cross-sectional view of ground terminal 15 is also shown.

Figure 19:
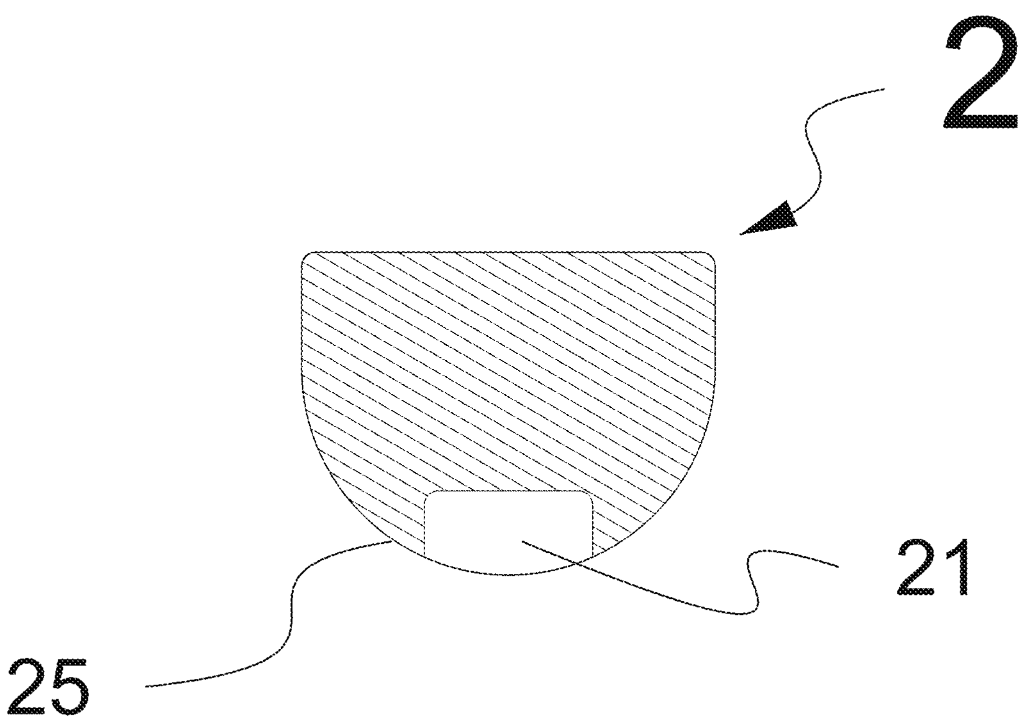
FIG. 19 is a top view of the strain relief mechanism removed from the body.

FIG. 19 is a top view of strain relief mechanism 2 separated from body 1. In this view, set screw receiving hole 21 is shown. Curved strain relief surface 25 is also visible. The shape of strain relief surface 25 fits in the complementary shaped curved inner wall 23 of body 1.

Figure 20:
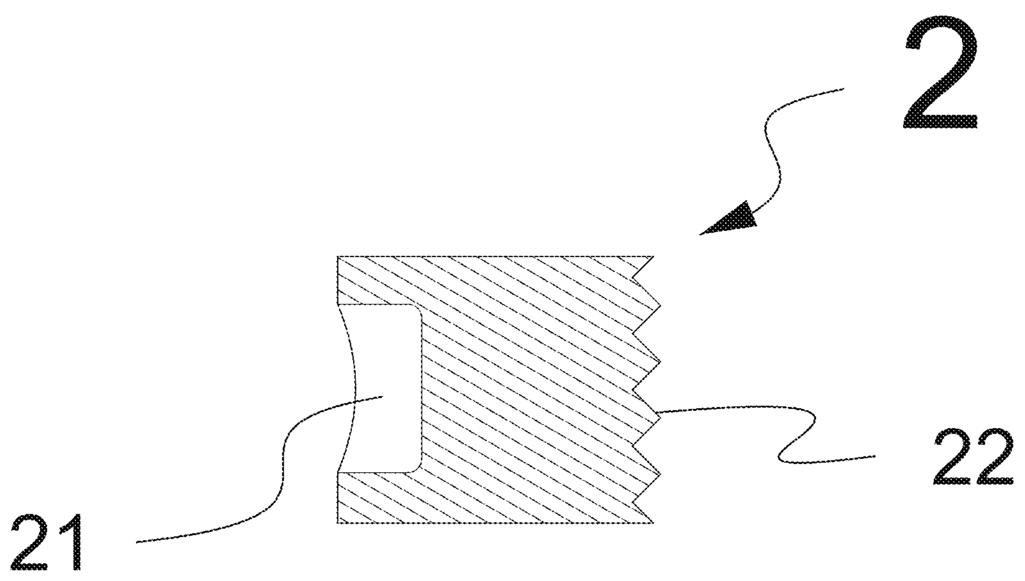
FIG. 20 is a side view of the strain relief mechanism removed from the body.

FIG. 20 is a side view of strain relief mechanism 2, separated from body 1, with toothed strain relief surface 22 shown. Set screw receiving hole 21 is also visible.

Figure 21:
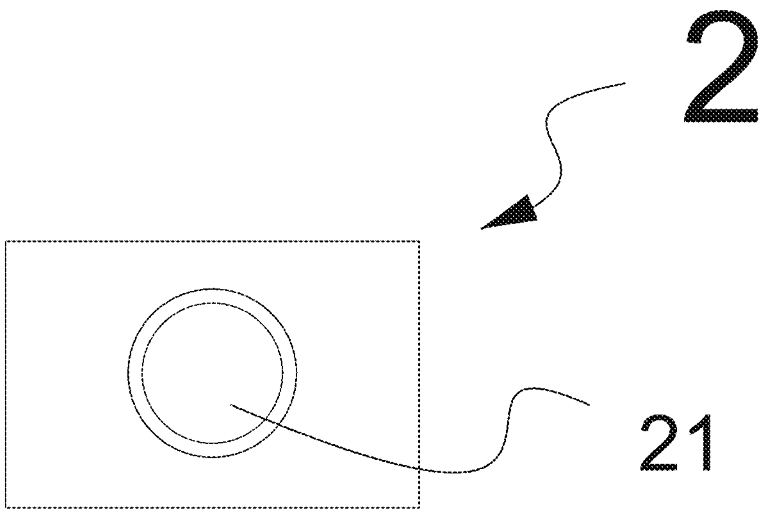
FIG. 21 is a front view of the strain relief mechanism removed from the body.

FIG. 21 is a front view of strain relief mechanism 2, shown separated from body 1. Set screw receiving hole 21 is also visible.

Figure 22:
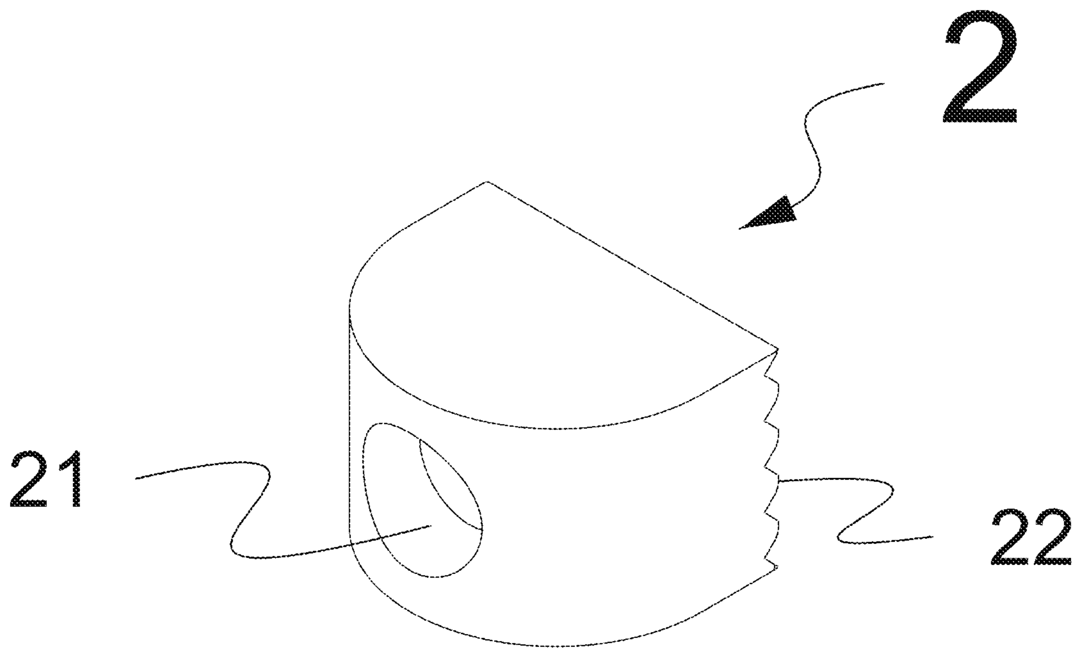
FIG. 22 is a front perspective view of the strain relief mechanism removed from the body.

FIG. 22 is a front perspective view of strain relief mechanism 2 shown with set screw receiving hole 21 and toothed strain relief surface 22 shown.

Figure 23:
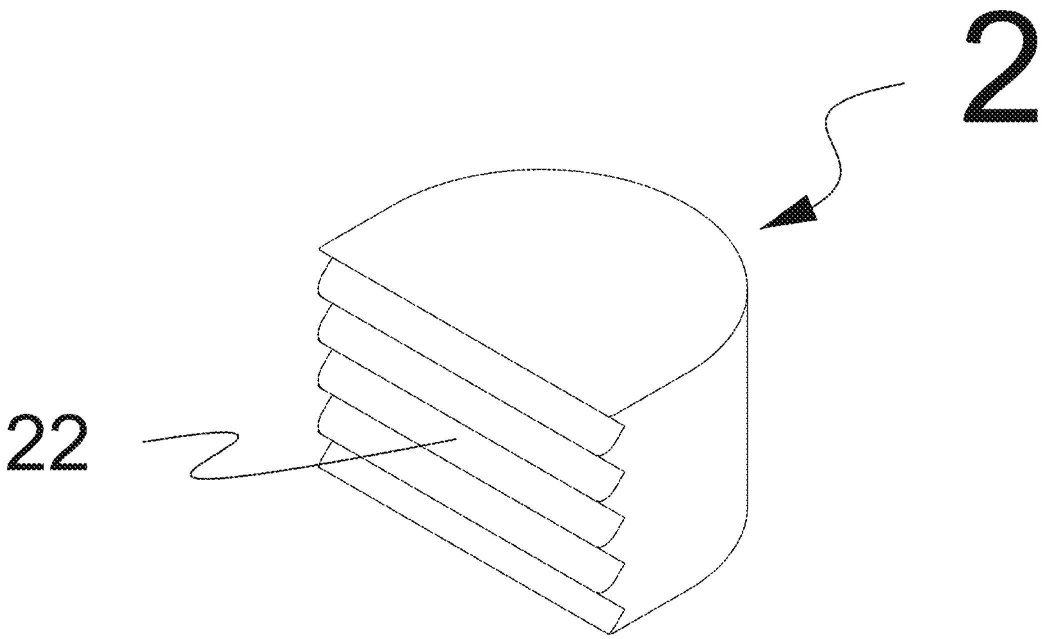
FIG. 23 is a rear perspective view of the strain relief mechanism removed from the body.

FIG. 23 is a rear perspective view of strain relief mechanism 2 shown with toothed strain relief surface 22 shown.

Figure 24:
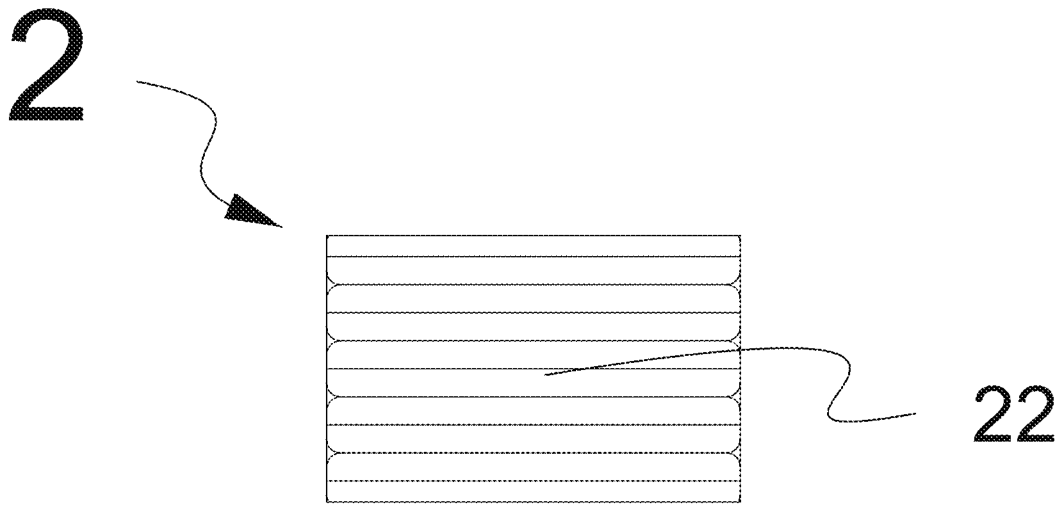
FIG. 24 is a rear view of the strain relief mechanism removed from the body

FIG. 24 is a rear view of strain relief mechanism 2 shown with toothed strain relief surface 22 shown.

Although the present invention has been described in relation to the above disclosed preferred embodiment, many modifications in design, implementation, systems and execution are possible while still maintaining the novel features and advantages of the invention. The preferred embodiment is not meant to limit the scope of the patent in any way, and it should be given the broadest possible interpretation consistent with the language of the disclosure on the whole.

The invention claimed is:

1. A device for holding a light comprising;

a light holder, where the light holder comprises a connector providing electrical power for the light;

a body coupled with the light holder, the body comprising a threaded exterior, a central wire conduit, an upper wire opening adjacent to the light holder and a threaded mount, where the central wire conduit, the upper wire opening and the threaded mount are arranged to allow a power cord to be routed through the threaded mount to the light holder; and a strain relief mechanism with a first smooth side sized to couple with a first side of the upper wire opening, a second side with one or more teeth that frictionally couples with the power cord and a screw for adjusting the force applied to the power cord.

2. The device for holding a light of claim 1 wherein the connector comprises two holes for pins.

3. The device for holding a light of claim 2 where the two holes for pins are separated by a distance between 4 mm and 12 mm.

4. The device for holding a light of claim 1 wherein the screw for adjusting the force applied to the power cord is routed through a hole in the body.

5. The device for holding a light of claim 1 wherein the power cord is comprised of a power wire and a ground wire, and the ground wire is coupled to a ground terminal in an upper compartment by a screw routed through a hole in the body.

6. The device for holding a light of claim 5 where the power wire and ground wire are formed of 18 gauge wire.

7. The device for holding a light of claim 1 where the threaded mount is sized to couple with a ⅜" diameter pipe with 27 threads per inch.

8. The device for holding a light of claim 1 where the light holder is comprised of porcelain, the body is formed of aluminum and the strain relief mechanism is formed of PETG plastic.

9. The device for holding a light of claim 1 where the light holder is coupled to the body by one or more screws.

10. The device for holding a light of claim 1 where the first smooth side of the strain relief mechanism is curved and the first side of the upper wire opening is curved such that the first smooth side of the strain relief mechanism couples with the first side of the upper wire opening.

* * * * *